United States Patent Office 3,362,952
Patented Jan. 9, 1968

3,362,952
α-METHOXYFLUOROBENZYLPENICILLINS
Edward Raymond Stove, Redhill, and Gordon Rodney Thomas, Sutton, England, assignors to Beecham Group Limited, Brentford, Middlesex, England, a British company
No Drawing. Filed June 16, 1965, Ser. No. 464,568
Claims priority, application Great Britain, July 3, 1964, 27,580/64
3 Claims. (Cl. 260—239.1)

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by Gram-positive bacteria.

The new penicillins of the present invention, in addition to their potent antibacterial activity, exhibit resistance to destruction by acid and are thereby capable of oral administration. Additionally, the novel compounds suffer considerably less depression of antibacterial activity in the presence of human serum than their closely related conventional analogues, and thus have enhanced therapeutic efficacy in man.

According to the present invention there is provided new penicillins of the general formula:

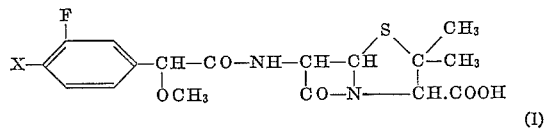

(I)

and non-toxic salts thereof, where X is a hydrogen or chlorine atom.

The salts are non-toxic salts including non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis - dehydroabietylethylenediamine, and other amines which have been used to form salts with benzylpenicillin.

The present invention further provides a process for the preparation of new penicillins having the general Formula I in which 6-aminopenicillanic acid or a salt thereof is coupled with an acid of the general formula:

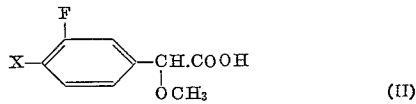

(II)

wherein X is as hereinbefore defined.

The coupling of the 6-aminopenicillanic acid and the α-methoxy acid may be effected by the use of the acid chloride of the α-methoxy acid or its functional equivalent as an acylating agent for a primary amino group. Such equivalents include the corresponding carboxylic acid bromides, azides, acid anhydrides and mixed anhydrides with other carboxylic acids, including monoesters and particularly lower aliphatic esters, of carbonic acid.

Alternatively, the 6-aminopenicillanic acid may be reacted with the intermediates formed from the α-methoxy acid and a condensing agent such as dicyclohexylcarbodiimide or carbonyldiimidazole.

The novel penicillins of the present invention are each capable of existing in two epimeric forms and it is to be understood that the invention includes both the D- and L- forms as well as the DL-mixture.

The following examples illustrate the invention:

EXAMPLE I m-Fluoro-α-methoxybenzylpenicillin m-Fluoro-α-methoxyphenyl acetic acid (8.0 g., Reeve et al., J. Amer. Chem. Soc., 1961, 83 2755) was reacted with thionyl chloride (8 ml.) at room temperature for 48 hours, followed by heating at 40° C. for 3 hours. The excess thionyl chloride was distilled and its last traces removed by codistillation with dry benzene (3 × 20 ml.).

The oily residue of m-fluoro-α-methoxyphenyl acetyl chloride (7.0 g.) was dissolved in dry acetone (50 ml.) and added to a stirred solution of 6-aminopenicillanic acid (7.5 g.) in a mixture of N/1 sodium bicarbonate solution (70 ml.) and acetone (20 ml.). The resulting clear yellow solution was stirred at room temperature for 2 hours. It was concentrated at low temperature and pressure to about 70 ml. and then ether (30 ml.) was added. The mixture was shaken and N/1 hydrochloric acid (38 ml.) was added to give pH 2.0. The ether layer was separated and combined with further ether extracts (2× 30 ml.) of the aqueous layer. The ether extracts were washed with water and then shaken with sufficient N/1 sodium bicarbonate solution (38 ml.) to give an aqueous phase of pH 7.4. The bicarbonate extract was separated and concentrated at low temperature and pressure to a viscous residue which was dried in vacuo over phosphorus pentoxide to give the sodium salt of m-fluoro-α-methoxybenzylpenicillin as a pale yellow slightly hygroscopic solid (86% weight yield).

The product was estimated to be 86% pure by colorimetric assay with hydroxylamine.

EXAMPLE II

4-chloro-3-fluoro-α-methoxybenzylpenicillin 4-chloro-m-toluidine (110 g.) was suspended in a mixture of 40% fluoroboric acid solution (345 ml.) and water (290 ml.) and stirred thoroughly at 5° C. A cool solution of sodium nitrite (53.6 g.) in water (110 ml.) was added at a rate sufficient to keep the temperature of the reaction mixture below 7° C. After standing overnight at 0° C., the mixture was filtered, and the solid residue successively washed with its own cool mother liquor, followed by cool 5% fluoroboric acid (140 ml.), cool methanol (110 ml.) and cool ether (350 ml.) to give 2-chloro-5-methylbenzene diazonium fluoroborate (M.P. 158° C.) as a slightly coloured solid (85% yield).

A portion (18 g.) was heated in an oil bath at 140° C. for 40 minutes and then with a free flame for 5 minutes in order to effect complete decomposition. The residue was extracted with ether (100 ml.,), and the extracts were washed with water (20 ml.), 2 N sodium hydroxide solution (20 ml.), and further water (6× 20 ml.) until the final washings were neutral. The ether extract was dried over magnesium sulphate, clarified by filtration, and concentrated. Finally distillation gave 4-chloro-3-fluorotoluene [B.P. 157–158° C, $n^{20.5}$ (62% weight yield). Found: Cl 24.01—$C_7H_6ClF$ requires Cl 24.46].

4-chloro-3-fluoroetoluene (31.8 g.) was stirred at 120° and bromine (22.7 ml.) was added over a period of 3 hours under illumination from an external ultraviolet lamp. The temperature of the mixture was raised to 160° C. and further bromine (5.8 ml.) was added over one hour. On cooling a hard crystalline mass formed and this was added in portions over 1 hour to concentrated sulphuric acid (100 ml.), heated on a steam bath. The resulting mixture was stirred and heated for a further 45 minutes and poured onto crushed ice. The resulting solid was collected by filtration, washed with fresh water and dissolved in ether (250 ml.). The ethereal phase was washed with N/1 sodium bicarbonate solution (2× 100 ml.) followed by water (100 ml.). The organic phase was dried over magnesium sulphate, clarified by filtration, and concentrated to leave an orange-brown coloured solid. This on steam distillation gave 4-chloro-3-fluorobenzaldehyde, M.P. 44–46° C., as a colourless crystalline solid (weight yield 75%).

A solution of 4-chloro-3-fluorobenzaldehyde (20.3 g.) in methanol (64 ml.) was treated with bromoform (38.8 g.) and cooled to 0° C. To the stirred solution a cool solution of potassium hydroxide (35.8 g.) in methanol (140 ml.) was added over twenty minutes. The cooling bath was removed and the stirred solution allowed to warm up spontaneously. At 30° C. inorganic material began to separate and the mixture darkened. The temperature was allowed to continue to rise to reflux temperature, and external cooling applied to moderate the rather violent boiling. The mixture was allowed to cool to room temperature and stand overnight. Water (128 ml.) and half saturated brine (384 ml.) were added, the mixture was heated to 60° C., then cooled to 20° C., washed with ether (200 ml.) and the pH adjusted to 3.3 with concentrated hydrochloric acid. A colourless solid separated and was collected by filtration after standing at 0° C. for 3 days. It was washed with acetone to give sodium hydrogen di-(4-chloro-3-fluoro-α-methoxyphenyl acetate) M.P. 187–190° C. (weight yield 49%). A specimen was recrystallised from ethanol for analysis. [Found: Cl, 15.26; Na, 4.66. $C_9H_8ClFO_3$. $C_9H_7ClFO_3Na$ requires Cl, 15.46; Na, 5.01.]

The sodium acid salt of 4-chloro-3-fluoro-α-methoxyphenylacetic acid (7.0 g.) was suspended in water (40 ml.) and dissolved with the addition of N/1 potassium hydroxide solution (30 ml.). N/1 hydrochloric acid (70 ml.) was added and the liberated 4-chloro-3-fluoro-α-methoxyphenylacetic acid was extracted with ether (3× 50 ml.). The ether extracts were combined, washed with water and dried over magnesium sulphate. Concentration of the ether extracts gave 4-chloro-3-fluoro-α-methoxyphenylacetic acid (6.8 g.) as a mobile oil which gradually crystallised.

The 4-chloro-3-fluoro-α-methoxyphenylacetic acid was converted to the acid chloride and coupled to 6-aminopenicillanic acid as described in Example 1, to give the sodium salt of 4-chloro-3-fluoro-α-methoxybenzylpenicillin (85% weight yield) as a slightly coloured solid.

The product was estimated to be 83% pure by colorimetric assay with hydroxylamine.

The following table illustrates the M.I.C. values against *Staph. aureus* Smith of the compounds of Examples 1 and 2 above the 3,4 dichloro-α-methoxybenzylpenicillin.

| Compound | M.I.C. (mcg./ml.) | |
|---|---|---|
| | 0% serum | 100% serum |
| Example 1 | 0.1 | 0.25 |
| Example 2 | 0.03 | 0.12 |
| 3,4 dichloro-α-methoxybenzylpenicillin | 0.03 | 0.5 |

These results show that whereas the novel compounds are no more active than 3,4-dichloro-α-methoxybenzylpenicillin in the absence of serum, they are distinctly more active than 3,4 dichloro-α-methoxy benzylpenicillin in 100% human serum.

We claim:
1. A compound selected from the group consisting of an acid of the formula:

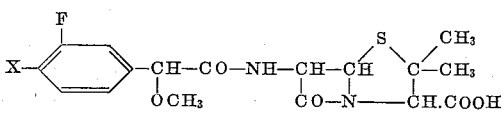

wherein X is a hydrogen or chlorine atom and its sodium, potassium, calcium, aluminium and ammonium salts and its non-toxic substituted ammonium salts with amines selected from the group consisting of tri(lower)alkylamines, procaine, dibenzylamine, N-benzyl-beta-phenethylamine, 1-ephenamine, N,N′ - dibenzylethylenediamine, dehydroabietylamine, N,N′ - bis-dehydroabietylethylenediamine and N-(lower)alkylpiperidines.

2. m-Fluoro-α-methoxybenzylpenicillin.
3. 4-chloro-3-fluoro-α-methoxybenzylpenicillin.

References Cited

UNITED STATES PATENTS 3,007,920  11/1961  Vanderhaeghe et al. _ 260—239.1

NICHOLAS S. RIZZO, *Primary Examiner.*